Oct. 18, 1960  R. W. PENNINGTON  2,956,358
MENU SELECTOR
Filed June 9, 1954  4 Sheets-Sheet 1

INVENTOR.
Ralph W. Pennington
BY
W. J. Eccleston
ATTORNEY

Oct. 18, 1960 R. W. PENNINGTON 2,956,358
MENU SELECTOR
Filed June 9, 1954 4 Sheets-Sheet 4

INVENTOR.
Ralph W. Pennington
BY
W. J. Eccleston
INVENTOR

United States Patent Office

2,956,358
Patented Oct. 18, 1960

2,956,358

MENU SELECTOR

Ralph W. Pennington, Rte. 3, Miamisburg, Ohio

Filed June 9, 1954, Ser. No. 435,653

2 Claims. (Cl. 40—70)

(Granted under Title 35, U.S. Code (1952), sec. 266)

The invention described herein, if patented, may be manufactured and used by or for the Government for governmental purposes, without the payment to me of any royalty thereon.

It is well understood among dietitians and others having to do with the planning and/or preparation of meals that variety in the basic foods served, as well as variations in their manner of preparation, are generally very essential, not only to improve or maintain the appetite of individual consumers, but also in the maintenance of the health of individuals in some instances.

It is also well known among dietitians and the like that some combinations of foods which may be highly desirable for use in cold climates or during the winter seasons in temperate climates, are not as appetizing or healthful in hot climates or during the summer in temperate climates. Moreover, the daily task of planning meals so as to give due weight to the chemistry of foods, providing nutritious and balanced meals, avoiding the use of seasonal foods at the wrong time of the year, and providing the necessary variety, becomes extremely burdensome.

This invention overcomes the foregoing difficulties by having as its primary object the provision of a menu selector which will present in a simple and concise manner a variety of menus. Furthermore, the selector is easily operated so as to indicate the desired variety of menus and at the same time take into account the various phases of meal planning as referred to above.

Other objects and advantages of the invention will be apparent from the following description when taken in connection with the accompanying drawings, in which, Figure 1 is a fragmentary plan view of one form of the menu selector;

Figure 1:
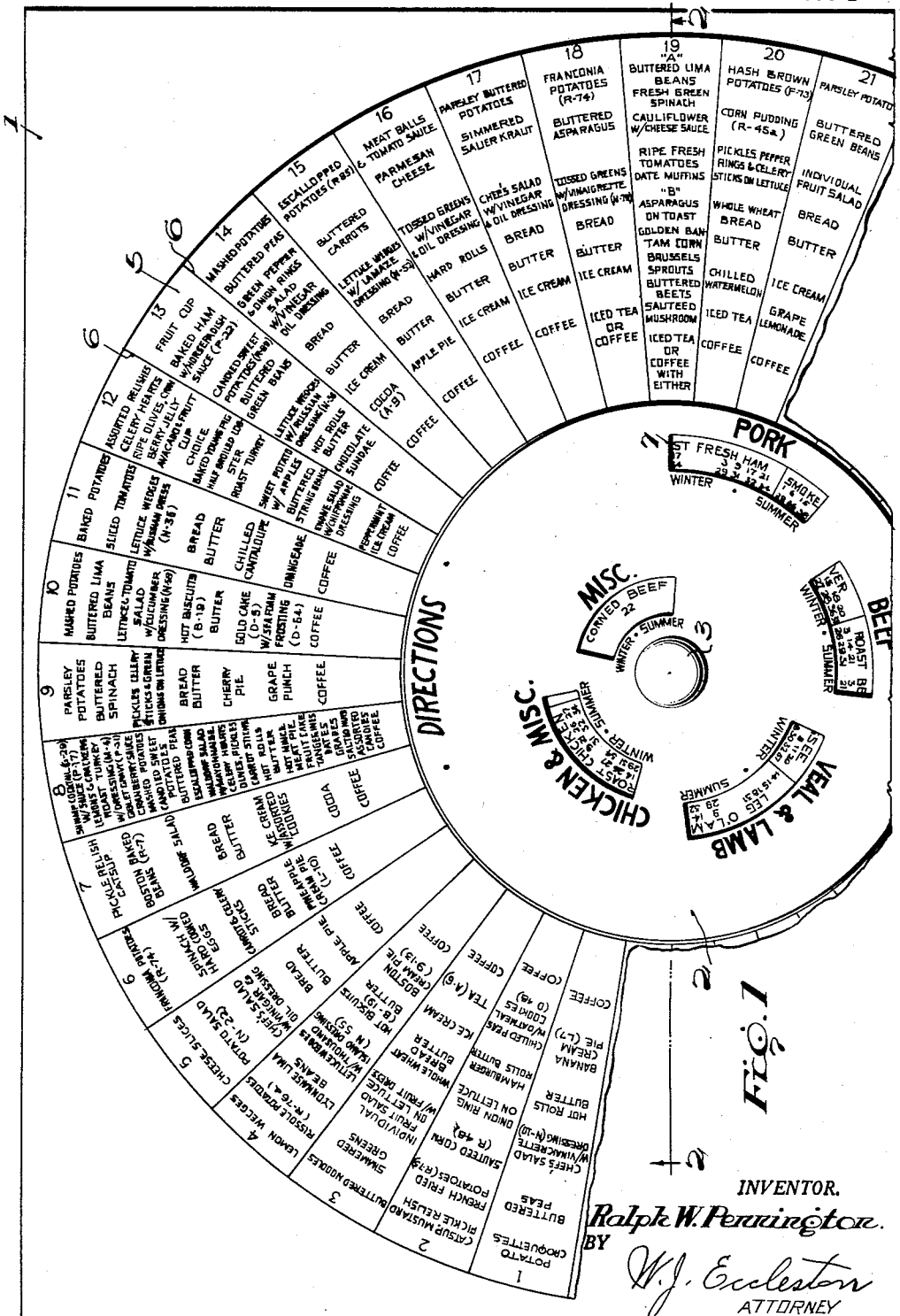
Figure 1A is a similar view of the portion of the selector omitted from Figure 1, the two views together showing an enlargement of the complete selector.
Figure 2:
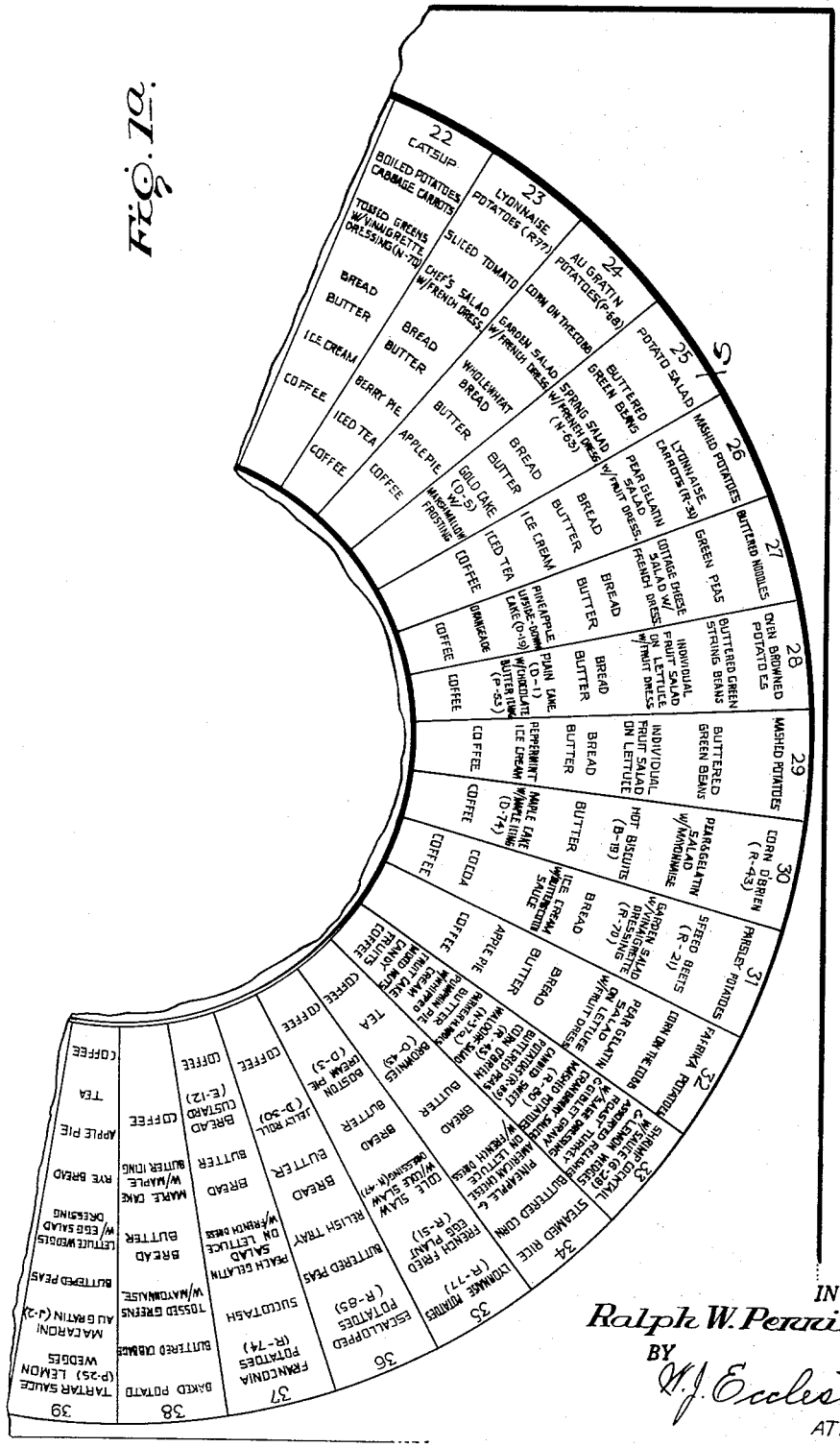
Figure 2 is a sectional view taken on line 2—2 of Figure 1.
Figure 3:
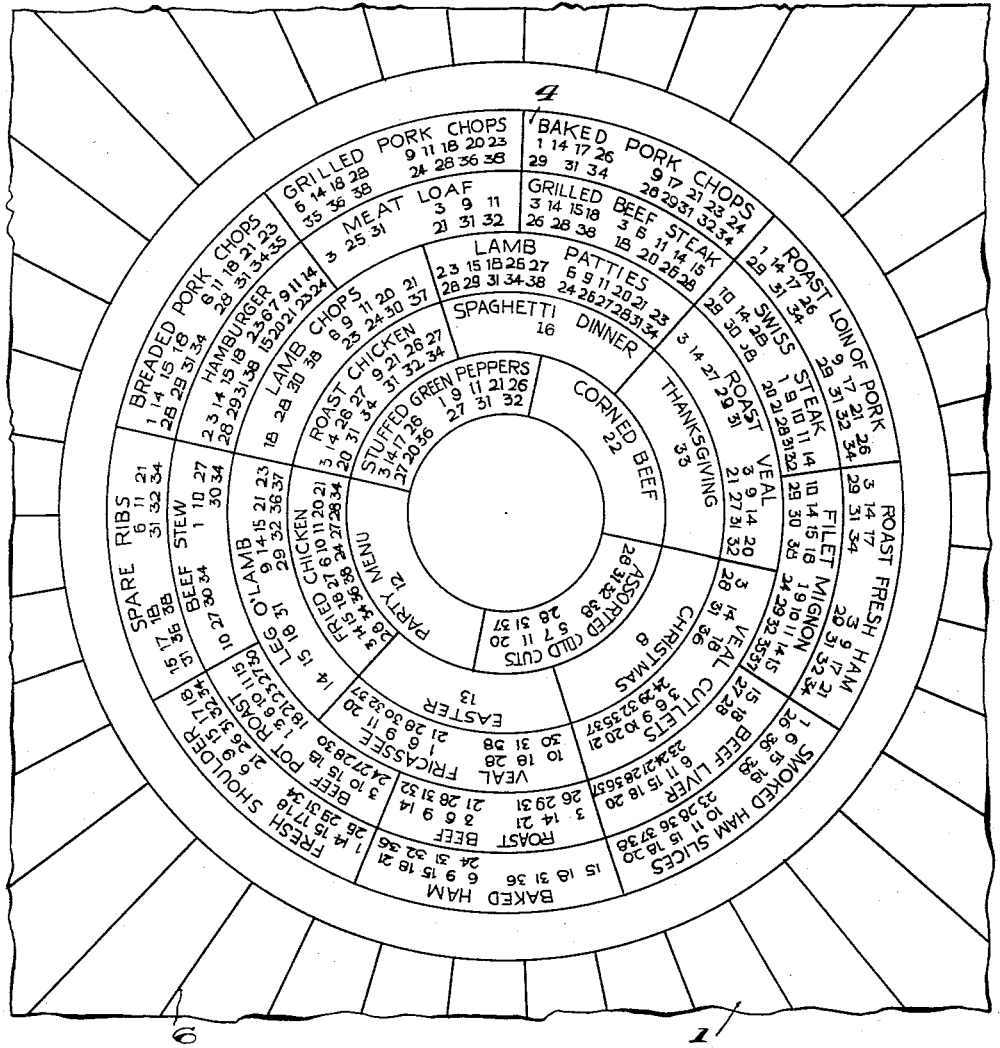
Figure 3 is an enlarged fragmentary plan view of the central portion of the base member.

Referring to the drawings in greater detail and particularly to Figures 1 to 3 inclusive, the numeral 1 indicates the base member of the selector, and the numeral 2 indicates a disk centrally disposed on the base member 1 and rotatably mounted thereon through the medium of a rivet or the like 3 which unites the two members of the selector.

Printed or otherwise displayed on a central and circular portion of the base member 1 are a plurality of circular series of units of indicia indicated generally by the numeral 4 on Figure 3. The outer circular series of units designates pork in various forms such as "Breaded Pork Chops," "Grilled Pork Chops," "Roast Loin of Pork," etc. The next innermost circular series of units of indicia relates to beef, as for instance, "Beef Pot Roast," "Beef Stew," "Hamburger," "Meat Loaf," etc. The next innermost circular series of units of indicia designates lamb in various forms as "Leg O' Lamb," "Lamb Patties," etc. The next innermost circular series of units of indicia designates a variety of main courses such as "Roast Chicken," "Spaghetti Dinner," "Thanksgiving," "Christmas," etc. The innermost series of units of indicia designates "Corn Beef," "Assorted Cold Cuts," "Party Menus," and "Stuffed Green Peppers."

The rotatably mounted disk 2 is of a diameter substantially corresponding with the diameter of the outermost series of main courses, i.e., the pork series and is provided with a substantially spirally arranged series of radially stepped sight openings there being five of these openings corresponding with the five circular series of main courses as indicated above; the outermost sight opening bearing the word "Pork," the next inner opening bearing the word "Beef," the next opening bearing the words "Veal & Lamb," the next opening bearing the notation "Chicken & Misc.," and the next opening bearing the single designation "Misc."

It will be apparent therefore that by rotating the disk 2 and observing through any one of the openings just mentioned the operator can select any one of the various foods listed in the particular circular series.

That portion of the base member 1 beyond the several radially stepped series of foods, may be provided with an annular series of groups of various vegetables, salads, breads, relishes, desserts, and other side dishes suitable for use with the several main courses tabulated on the central portion of the base member. These groups of vegetables, etc., plus several complete dinners for parties and holidays are numbered 1 to 39, and while they are shown as encircling the centrally located indicia 4 may, of course, be placed in various other positions. The groups of vegetables, etc., are indicated generally by the numeral 5 and are tabulated in sector-shape, preferably bounded by radial lines 6.

It is obvious to those skilled in the art that a great number of varieties of vegetables, salads, etc., may be combined with the various forms of pork, beef, lamb, etc., and yet provide appetizing and healthful meals. Therefore, in order that the desired variety of combinations may be readily indicated by the use of the menu selector, the reference numbers or keys of the various groups 5 of vegetables, etc., are positioned in clusters just below the several units of indicia for the various main courses in each series. Also, as heretofore indicated, some foods which are highly desirable, beneficial and appetizing in cold weather are not necessarily proper foods for use in hot weather. Consequently, two sub-clusters of numbers representing the various appropriate groups of vegetables are laterally spaced with respect to each of the main courses, as for instance, under the "Spare Ribs" at the top of Figure 3 are the reference numerals "15," "17," "18," "31," "36" and "38," at the left of the particular indicia, and at the right thereof are the reference numerals "6," "11," "21," "31," "32" and "34." These two separate and distinct groups of reference numerals representing a variety of groups of vegetables for use with "Spare Ribs" are for seasonal use, that is to say, under each of the sight openings 7 in the disk 2 are the words "summer" and "winter" so as to indicate which of the several groups of vegetables may be used in the combination in winter and which in summer.

In the operation of this form of the invention the dietitian, if desiring to plan a meal in which the main course is to be beef, and assuming that the selection is being made in cold weather, merely turns the disk 2 to view the various forms of "beef" as set forth in the second annular series of main courses, and may for instance select "Beef Pot Roast." Then the operator will note the reference characters 3, 10, 15, 18, 24, 27, 28 and 30. These reference characters, as will be readily understood, relate to the various groups of vegetables, etc., designated by the numerals 1 to 39 inclusive, and by employing any one of the eight groups indicated, a meal which has been found to be suitable for cold weather and which is appetizing, nutritious, etc., will be indicated.

Figure 4:
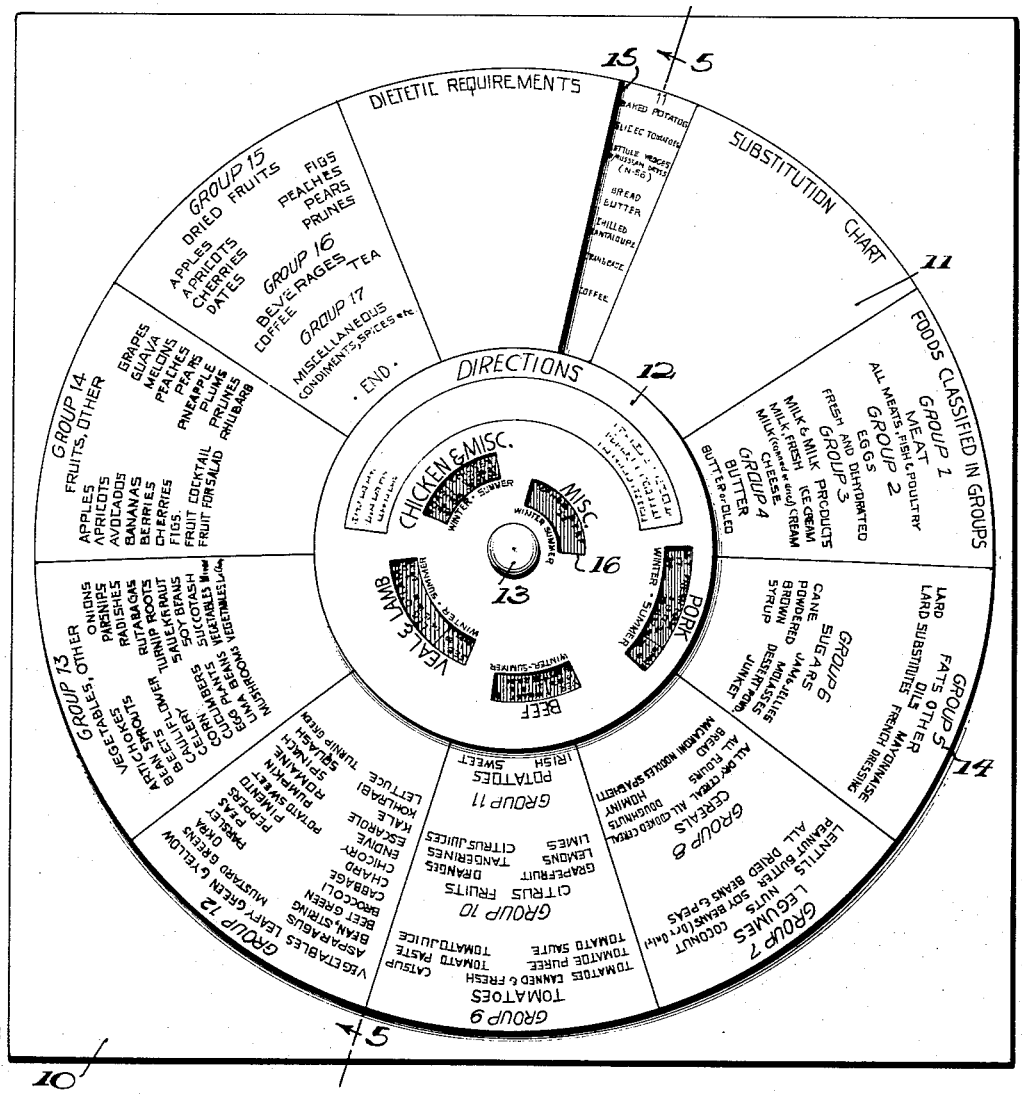
Figure 4 is a plan view of a modified construction of the menu selector.
Figure 5:
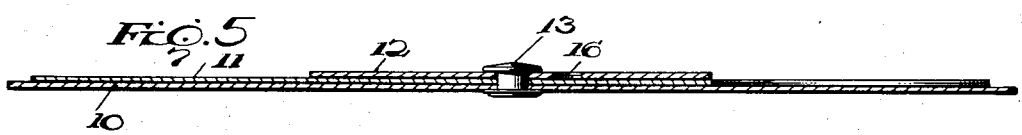
Figure 5 is a section taken on line 5—5 of Figure 4.

Another form of the invention is disclosed in Figures 4 and 5 which is quite similar to the menu selector just described. In this latter form of the invention, however, three elements are employed in lieu of the two elements described in connection with the disclosures of Figures 1 to 3 inclusive. In this modified form the base member is indicated by the numeral 10 and mounted thereon are the disks 11 and 12 which are rotatably secured to the center of the base member by means of a rivet or the like 13.

In this second form of the invention the printed matter indicating the various main courses, vegetables, party means, etc., are identical with those of the first form of the invention. The difference between the two structures is that the plurality of circular series of units of indicia disposed beneath the smaller disk 12 is placed on the central portion of the intermediate disk 11 rather than on the base member 10 as was the case in the first form of the invention. Also, the intermediate disk 11 in addition to bearing a tabulation of groups of foods of different forms beyond the central groups, as indicated generally by the numeral 14, is provided with a radial slot 15 of a size and elongated shape corresponding to the size and elongated shape of each of the thirty-nine groups of indicia representing matched assemblies of vegetables and other side dishes, so that after the operator has rotated the inner disk 12 to bring one of the spirally arranged radially stepped series of sight openings 16 into position so as to select the main course from the family of meat dishes from the proper annular series, may then rotate the intermediate disk 11 together with inner disk 12 so as to bring the radial sight opening 15 into register with any one of the various groups of seasonal vegetables, etc., selected after viewing the particular cluster or sub-cluster of reference characters or keys disclosed through the particular sight opening. This intermediate disk 11 provides a medium on which the several additional groups of foods may be tabulated for reference by the dietitian, and also, by reason of the radial slot 15 serves to more readily select and indicate the particular group of vegetables it is intended to employ with the selected meat course.

In accordance with the patent statutes, I have described what I now consider to be the preferred forms of the menu selector, but inasmuch as various minor changes in structural details and arrangements may be made without departing from the spirit of the invention, it is intended that all such changes be included within the scope of the appended claims.

I claim:

1. A menu selector comprising (A) a base member having an unmarked central portion surrounded by an annularly arranged series of radially disposed elongated groups of indicia, each of said indicia representing a matched assembly of side dishes; (B) an intermediate disk rotatably mounted on said base member at its center, said intermediate disk bearing on its central portion a plurality of annularly arranged concentric series of clusters of indicia, each of said annular series of second-named indicia representing a family of meat dishes, and each cluster of said second-named indicia comprising a plurality of keys to a plurality of said first-named side dish indicia; and said intermediate disk being provided with an elongated radial sight slot for selective cooperation with said radially disposed elongated groups of said first-named indicia; and (C) an outer disk rotatably mounted on said base member at its center, said outer disk being provided with a radially stepped series of sight openings for selective cooperation with said clusters of said second-named indicia, each of said sight openings cooperating with one of said annular series of meat families; whereby said outer disk and intermediate disk may be unitarily rotated into cooperative visual juxtaposition with one or more of said elongated groups of said first-named indicia identified by the keys in said clusters of second-named indicia, so as to visually present a complete balanced menu having a pre-selected principal meat dish and an assembly of side dishes compatible therewith, said meat dish being visualized through one of said sight openings, and said side dishes being visualized through said radial sight slot.

2. A seasonal menu selector comprising (A) a base member having an unmarked central portion surrounded by an annularly arranged series of radially disposed elongated groups of indicia, each of said indicia representing a matched assembly of side dishes; (B) an intermediate disk rotatably mounted on said base member at its center, said intermediate disk bearing on its central portion a plurality of annularly arranged concentric series of clusters of indicia, each of said annular series of second-named indicia representing a family of meat dishes, and each cluster of said second-named indicia in said series being sub-divided into a plurality of sub-clusters arranged side-by-side, each of said sub-clusters corresponding to a pre-determined calendar season and comprising a plurality of keys to a plurality of said first-named side dish indicia; and said intermediate disk being provided with an elongated radial sight slot for selective cooperation with said radially disposed elongated groups of said first-named indicia; and (C) an outer disk rotatably mounted on said base member at its center, said outer disk being provided with a radially stepped series of elongated sight openings for selective cooperation with said clusters of said second-named indicia to permit simultaneous inspection of all sub-clusters in a selected cluster, each of said sight openings cooperating with one of said annular series of meat families; whereby said outer disk and intermediate disk may be unitarily rotated into cooperative visual juxtaposition with one or more of said elongated groups of said first-named indicia identified by the keys in said clusters of second-named indicia, so as to visually present a complete balanced menu having a pre-selected principal meat dish and an assembly of side dishes compatible therewith during the calendar season indicated by a sub-cluster, said meat dish and season-indicating sub-cluster being visualized through one of said sight openings, and said side dishes being visualized through said radial sight slot.

References Cited in the file of this patent

UNITED STATES PATENTS

| | | |
|---|---|---|
| 1,323,763 | Haskell | Dec. 2, 1919 |
| 1,849,379 | Passek | Mar. 15, 1932 |
| 1,989,353 | Davis | Jan. 29, 1935 |
| 2,098,394 | Lane | Nov. 9, 1937 |
| 2,592,106 | Askeli | Apr. 8, 1952 |